United States Patent
Liu et al.

(10) Patent No.: US 11,128,363 B2
(45) Date of Patent: Sep. 21, 2021

(54) CHANNEL QUALITY INFORMATION REPORTING METHOD, APPARATUS, AND SYSTEM

(71) Applicant: HUAWEI TECHNOLOGIES CO., LTD., Guangdong (CN)

(72) Inventors: Jianqin Liu, Beijing (CN); Yan Cheng, Beijing (CN); Kunpeng Liu, Beijing (CN)

(73) Assignee: Huawei Technologies Co., Ltd., Guangdong (CN)

( * ) Notice: Subject to any disclaimer, the term of this patent is extended or adjusted under 35 U.S.C. 154(b) by 0 days.

(21) Appl. No.: 16/369,929

(22) Filed: Mar. 29, 2019

(65) Prior Publication Data
US 2019/0229793 A1   Jul. 25, 2019

Related U.S. Application Data

(63) Continuation of application No. PCT/CN2017/104068, filed on Sep. 28, 2017.

(30) Foreign Application Priority Data

Sep. 30, 2016   (CN) .......................... 201610879323.1

(51) Int. Cl.
*H04B 7/06*   (2006.01)
*H04W 24/10*   (2009.01)
(Continued)

(52) U.S. Cl.
CPC ............. *H04B 7/0632* (2013.01); *H04B 7/26* (2013.01); *H04B 17/318* (2015.01); *H04L 1/00* (2013.01); *H04W 24/10* (2013.01); *H04B 7/0641* (2013.01)

(58) Field of Classification Search
CPC ...... H04B 7/0632; H04B 7/26; H04B 17/318; H04B 7/0641; H04B 7/0626; H04L 1/00; H04L 5/0057; H04L 1/0026; H04W 24/10
See application file for complete search history.

(56) References Cited

U.S. PATENT DOCUMENTS

2006/0072508 A1 *   4/2006   Zou ........................ H04W 28/18
                                                             370/332
2009/0225738 A1 *   9/2009   Xu ......................... H04W 72/08
                                                             370/343
(Continued)

FOREIGN PATENT DOCUMENTS

CN   101815333 A   8/2010
CN   101841356 A   9/2010
(Continued)

OTHER PUBLICATIONS

3GPP TS 36.213 V10.1.0 (Mar. 2011), "3rd Generation Partnership Project; Technical Specification Group Radio Access Network; Evolved Universal Terrestrial Radio Access (E-UTRA); Physical layer procedures (Release 10)," 3GPP Technical Specification, Mar. 2011, 115 pages.

(Continued)

*Primary Examiner* — Tejis Daya
(74) *Attorney, Agent, or Firm* — Fish & Richardson P.C.

(57) ABSTRACT

The present disclosure relates to channel quality information reporting methods, apparatus, and systems. One example method includes obtaining, by a user equipment (UE), a reporting method of reporting channel quality information by the UE, and reporting, by the UE, the channel quality information to a base station in the reporting method. The reporting method comprises at least one of a reporting granularity, a reporting range, and a reporting mode.

19 Claims, 7 Drawing Sheets

(51) Int. Cl.
  *H04L 1/00*     (2006.01)
  *H04B 7/26*     (2006.01)
  *H04B 17/318*   (2015.01)

(56) References Cited

U.S. PATENT DOCUMENTS

| | | | |
|---|---|---|---|
| 2010/0271968 A1* | 10/2010 | Liu | H04B 7/024 |
| | | | 370/252 |
| 2011/0222473 A1* | 9/2011 | Breit | H04L 25/0222 |
| | | | 370/328 |
| 2012/0020288 A1 | 1/2012 | Liu et al. | |
| 2014/0010126 A1 | 1/2014 | Sayana et al. | |
| 2014/0177744 A1 | 6/2014 | Krishnamurthy et al. | |
| 2014/0369294 A1 | 12/2014 | Seo et al. | |
| 2015/0016288 A1* | 1/2015 | Maattanen | H04W 24/08 |
| | | | 370/252 |
| 2015/0036612 A1* | 2/2015 | Kim | H04B 17/318 |
| | | | 370/329 |
| 2015/0092768 A1* | 4/2015 | Ng | H04W 48/16 |
| | | | 370/350 |
| 2016/0285660 A1 | 9/2016 | Frenne et al. | |
| 2017/0303265 A1* | 10/2017 | Islam | H04B 7/088 |

FOREIGN PATENT DOCUMENTS

| | | |
|---|---|---|
| CN | 102237958 A | 11/2011 |
| CN | 103004115 A | 3/2013 |
| CN | 105323041 A | 2/2016 |
| EP | 2568646 A1 | 3/2013 |
| GB | 2500254 A | 9/2013 |
| JP | 2007251924 A | 9/2007 |
| JP | 2015510330 A | 4/2015 |
| KR | 20150023641 A | 3/2015 |
| WO | 2016086144 A1 | 6/2016 |

OTHER PUBLICATIONS

Cisco et al., "Verizon 5G TF; Air Interface Working Group; Verizon 5th Generation Radio Access; Physical layer procedures (Release 1)," TS V5G.213 v1.0 (Jun. 2016), Jun. 2016, 47 pages.
PCT International Search Report and Written Opinion issued in International Application No. PCT/CN2017/104068 dated Dec. 18, 2017, 19 pages (with English translation).
Extended European Search Report issued in European Application No. 17854958.0 dated Jul. 23, 2019, 12 pages.
Office Action issued in Japanese Application No. 2019-517774 dated Jun. 2, 2020, 5 pages (with English translation).
EPO Communication pursuant to Article 94(3) EPC issued in European Application No. 17854958.0 dated Aug. 31, 2020, 16 pages.
Notice of Preliminary Rejection in Korean Application No. 10-2019-7012169 dated Mar. 30, 2020, 10 pages (With English Translation).
3GPP TS 45.008 V13.2.0 (May 2016), "3rd Generation Partnership Project; Technical Specification Group GSM/EDGE Radio Access Network; Radio subsystem link control (Release 13)," May 2016, 165 pages.
Huawei et al., "Reporting relaxations for power consumption reduction in MTC UEs," 3GPP TSG RAN WG1 Meeting #80, R1-150036, Athens, Greece, Feb. 9-13, 2015, 4 pages.
ITRI, "Discussions of CSI Reporting for FD-MIMO," 3GPP TSG RAN WG1 Meeting #82, R1-154365, Beijing, China, Aug. 24-28, 2015, 4 pages.
Office Action issued in Chinese Application No. 201910289152.0 dated Jul. 17, 2020, 14 pages (with English translation).
Office Action issued in Chinese Application No. 201910289152.0 dated Oct. 19, 2020, 6 pages (with English translation).

* cited by examiner

Base station 100  Mobile phone 101

CHANNEL QUALITY INFORMATION REPORTING METHOD, APPARATUS, AND SYSTEM

CROSS-REFERENCE TO RELATED APPLICATIONS

This application is a continuation of International Application No. PCT/CN2017/104068, filed on Sep. 28, 2017, which claims priority to Chinese Patent Application No. 2016/10879323.1, filed on Sep. 30, 2016, both of which are hereby incorporated by reference in their entireties.

TECHNICAL FIELD

The present application relates to the field of communications technologies, and in particular, to a channel quality information reporting method, an apparatus, and a system.

BACKGROUND

With continuous development of communications technologies, a beamforming technology is more widely applied. In the beamforming technology, a base station generates a directional beam by adjusting a weighting coefficient of each antenna in an antenna array of the base station, so as to obtain a relatively large antenna gain, to compensate for a downlink signal loss in a process in which the base station sends a downlink signal to user equipment (UE).

Currently, in a process in which the base station sends a downlink signal to the UE by using the beamforming technology, to avoid a problem that the downlink signal sent by the base station possibly cannot reach the UE in a direction of a current shaped beam because the UE moves, and consequently receiving the downlink signal by the UE is frequently interrupted, the UE needs to dynamically report channel quality information that can reflect a channel state between the base station and the UE to the base station. Specifically, the UE needs to report channel quality information to the base station after obtaining the channel quality information through measurement each time, so that the base station can select a new shaped beam based on the channel quality information reported by the UE. In this way, it is ensured that the downlink signal sent by the base station to the UE can successfully reach the UE in a direction of the new shaped beam.

In the above channel quality information reporting method, because the UE needs to report channel quality information to the base station after obtaining the channel quality information through measurement each time, the UE needs to report a relatively large quantity of pieces of channel quality information. Consequently, overheads for reporting the channel quality information by the UE may be relatively high.

SUMMARY

This application provides a channel quality information reporting method, an apparatus, and a system, to reduce overheads for reporting channel quality information by UE.

To achieve the foregoing objective, the following technical solutions are used in this application:

According to a first aspect, a channel quality information reporting method is provided, including: obtaining, by a base station, a reporting manner of reporting channel quality information by UE; receiving the channel quality information reported by the UE in the reporting manner; and demodulating the channel quality information based on the reporting manner.

In this application, because the base station and the UE can flexibly and adaptively agree on a reporting manner of reporting channel quality information by the UE, the agreed reporting manner can better adapt to a requirement of reporting the channel quality information by the UE, so that the UE reports the channel quality information in the agreed reporting manner, thereby reducing overheads for reporting the channel quality information by the UE.

In a first optional implementation of the first aspect, the receiving, by the base station, the channel quality information reported by the UE may include: receiving, by the base station from a physical channel, the channel quality information reported by the UE, where the physical channel includes at least one of a physical uplink control channel and a physical uplink shared channel.

In this application, when the UE reports the channel quality information to the base station on the physical uplink control channel, the base station receives, from the physical uplink control channel, the channel quality information reported by the UE; or when the UE reports the channel quality information to the base station on the physical uplink shared channel, the base station receives, from the physical uplink shared channel, the channel quality information reported by the UE.

In a second optional implementation of the first aspect, after the obtaining, by a base station, a reporting manner of reporting channel quality information by UE, and before the receiving, by the base station, the channel quality information reported by the UE, the method further includes: configuring, by the base station for the UE, the reporting manner of reporting the channel quality information by the UE.

In this application, the base station configures, for the UE, the reporting manner that is of reporting the channel quality information by the UE and that is obtained by the base station, so that after receiving the reporting manner configured by the base station, the UE can report the channel quality information to a base station in the reporting manner.

In a third optional implementation of the first aspect, the configuring, by the base station, the reporting manner for the UE may include: sending, by the base station, higher layer signaling and/or physical layer control signaling including indication information of the reporting manner to the UE.

In this application, the base station sends the higher layer signaling and/or the physical layer control signaling including the indication information of the reporting manner to the UE, so that after receiving the higher layer signaling and/or the physical layer control signaling, the UE can determine the reporting manner based on the indication information in the higher layer signaling and/or the physical layer control signaling, and then the UE can report the channel quality information to a base station in the reporting manner.

According to a second aspect, a channel quality information reporting method is provided, including: obtaining, by UE, a reporting manner of reporting channel quality information by the UE; and reporting the channel quality information to a base station in the reporting manner.

In this application, because the base station and the UE can flexibly and adaptively agree on a reporting manner of reporting channel quality information by the UE, the agreed reporting manner can better adapt to a requirement of reporting the channel quality information by the UE, so that the UE reports the channel quality information in the agreed reporting manner, thereby reducing overheads for reporting the channel quality information by the UE.

In a first optional implementation of the second aspect, the reporting, by the UE, the channel quality information to a base station in the reporting manner may include: reporting, by the UE, the channel quality information to the base station on a physical channel in the reporting manner, where the physical channel includes at least one of a physical uplink control channel and a physical uplink shared channel.

In this application, the UE may report the channel quality information to the base station on the physical uplink control channel and/or the physical uplink shared channel in the reporting manner. In this way, the UE can report the channel quality information to the base station on different physical channels.

In a second optional implementation of the second aspect, the obtaining, by UE, a reporting manner of reporting channel quality information by the UE may include: determining, by the UE, the reporting manner based on the channel quality information, where the channel quality information reported by the UE to the base station further includes indication information of the reporting manner.

In this application, the indication information in the channel quality information reported by the UE to the base station may indicate, to the base station, the reporting manner currently used by the UE to report the channel quality information, so that the base station can learn of the reporting manner of reporting the channel quality information by the UE.

In a third optional implementation of the second aspect, the obtaining, by UE, a reporting manner of reporting channel quality information by the UE may include: receiving, by the UE, the reporting manner that is of reporting the channel quality information by the UE and that is configured by the base station.

In a fourth optional implementation of the second aspect, the receiving, by the UE, the reporting manner configured by the base station may include: receiving, by the UE, higher layer signaling and/or physical layer control signaling including indication information of the reporting manner that are/is sent by the base station.

In this application, after receiving the higher layer signaling and/or the physical layer control signaling including the indication information of the reporting manner that are/is sent by the base station, the UE may determine the reporting manner based on the indication information in the higher layer signaling and/or the physical layer control signaling, and then the UE may report the channel quality information to a base station in the reporting manner.

According to a third aspect, a base station is provided, and the base station includes an obtaining module, a receiving module, and a demodulation module, where the obtaining module is configured to determine a reporting manner of reporting channel quality information by user equipment UE; the receiving module is configured to receive the channel quality information reported by the UE in the reporting manner; and the demodulation module is configured to demodulate, based on the reporting manner, the channel quality information received by the receiving module.

In a first optional implementation of the third aspect, the receiving module is specifically configured to receive, from a physical channel, the channel quality information reported by the UE, where the physical channel includes at least one of a physical uplink control channel and a physical uplink shared channel.

In a second optional implementation of the third aspect, the base station further includes a configuration module, and the configuration module is configured to: after the obtaining module determines the reporting manner of reporting the channel quality information by the UE, and before the receiving module receives the channel quality information reported by the UE, configure, for the UE, the reporting manner of reporting the channel quality information by the UE.

In a third optional implementation of the third aspect, the configuration module is specifically configured to send higher layer signaling and/or physical layer control signaling including indication information of the reporting manner to the UE.

For technical effects of any one of the third aspect and the optional implementations of the third aspect, refer to related descriptions of technical effects of any one of the first aspect and the optional implementations of the first aspect. Details are not described herein again.

In the first aspect and the third aspect, the reporting manner may be predefined in the base station.

In this application, the reporting manner is predefined (prestored) in the base station, and the reporting manner predefined in the base station is the same as a reporting manner predefined in the UE, so that when the UE reports the channel quality information in the predefined reporting manner, the base station can learn of the reporting manner of reporting the channel quality information by the UE.

According to a fourth aspect, UE is provided, and the UE includes an obtaining module and a reporting module, the obtaining module is configured to obtain a reporting manner of reporting channel quality information by the UE; and the reporting module is configured to report the channel quality information to a base station in the reporting manner.

In a first optional implementation of the fourth aspect, the reporting module is specifically configured to report the channel quality information to the base station on a physical channel in the reporting manner, where the physical channel includes at least one of a physical uplink control channel and a physical uplink shared channel.

In a second optional implementation of the fourth aspect, the obtaining module is specifically configured to determine the reporting manner of reporting the channel quality information by the UE, where the channel quality information reported by the reporting module to the base station further includes indication information of the reporting manner.

In a third optional implementation of the fourth aspect, the obtaining module is specifically configured to receive the reporting manner that is of reporting the channel quality information by the UE and that is configured by the base station.

In a fourth optional implementation of the fourth aspect, the obtaining module is specifically configured to receive higher layer signaling and/or physical layer control signaling including indication information of the reporting manner that are/is sent by the base station.

For technical effects of any one of the fourth aspect and the optional implementations of the fourth aspect, refer to related descriptions of technical effects of any one of the second aspect and the optional implementations of the second aspect. Details are not described herein again.

In the second aspect and the fourth aspect, the reporting manner may be predefined in the UE.

In this application, the reporting manner is predefined (prestored) in the UE, and the reporting manner predefined in the UE is the same as a reporting manner predefined in the base station, so that when the UE reports the channel quality information in the predefined reporting manner, the base station can learn of the reporting manner of reporting the channel quality information by the UE.

In the first aspect to the fourth aspect, the reporting manner includes at least one of a reporting granularity, a reporting range, and a reporting mode.

In this application, the reporting manner may include at least one of the reporting granularity, the reporting range, and the reporting mode. In this way, a plurality of reporting manners of reporting the channel quality information can be provided, and the UE can flexibly choose to report the channel quality information to the base station in at least one of the plurality of reporting manners.

In the first aspect to the fourth aspect, the reporting mode includes a first reporting mode and a second reporting mode, and a quantity of bits for reporting the channel quality information by the UE in the first reporting mode is greater than or equal to a quantity of bits for reporting the channel quality information by the UE in the second reporting mode.

In the first aspect to the fourth aspect, the first reporting mode is a non-differential reporting mode, and the second reporting mode is a differential reporting mode.

In this application, when the reporting mode is the differential reporting mode, the UE may report the channel quality information to the base station based on the differential reporting mode. Specifically, the UE reports, to the base station, a difference between channel quality information obtained through current measurement and channel quality information obtained by the UE through previous measurement, but the UE does not need to report absolute information of the channel quality information (namely, a specific value of the channel quality information) obtained through the current measurement to the base station. In this way, a quantity of pieces of channel quality information reported by the UE is relatively small, so that overheads for reporting the channel quality information by the UE to the base station can be reduced.

In the first aspect to the fourth aspect, the reporting granularity includes a first reporting granularity and a second reporting granularity, the first reporting granularity is a granularity of reporting the channel quality information by the UE on the physical uplink control channel, and the second reporting granularity is a granularity of reporting the channel quality information by the UE on the physical uplink shared channel.

In the first aspect to the fourth aspect, the first reporting granularity is greater than or equal to the second reporting granularity.

In this application, the physical uplink control channel has limited resources. Therefore, the base station and the UE may obtain the larger first reporting granularity for reporting the channel quality information by the UE to the base station by using the physical uplink control channel, so that overheads for reporting the channel quality information by the UE to the base station can be reduced, and resources of the physical uplink control channel can be further reduced. In addition, the base station and the UE may obtain the smaller second reporting granularity for reporting the channel quality information by the UE to the base station by using the physical uplink shared channel, so that accuracy of reporting the channel quality information by the UE to the base station can be improved.

According to a fifth aspect, a base station is provided, and the base station includes a processor, a transceiver, and a memory, where the memory is configured to store a computer executable instruction, and when the base station runs, the processor executes the computer executable instruction stored in the memory, so that the base station performs the channel quality information reporting method in any one of the first aspect and the optional implementations of the first aspect.

According to a sixth aspect, a computer readable storage medium is provided, and the computer readable storage medium may include a computer instruction, where when the computer instruction runs on a base station, the base station performs the channel quality information reporting method in any one of the first aspect and the optional implementations of the first aspect.

According to a seventh aspect, a computer program product including an instruction is provided, where when the computer program product runs on a base station, the base station performs the channel quality information reporting method in any one of the first aspect and the optional implementations of the first aspect.

For technical effects of the fifth aspect to the seventh aspect, refer to related descriptions of technical effects of any one of the first aspect and the optional implementations of the first aspect. Details are not described herein again.

According to an eighth aspect, UE is provided, and the UE includes a processor, a transceiver, and a memory, where the memory is configured to store a computer executable instruction, and when the UE runs, the processor executes the computer executable instruction stored in the memory, so that the UE performs the channel quality information reporting method in any one of the second aspect and the optional implementations of the second aspect.

According to a ninth aspect, a computer readable storage medium is provided, and the computer readable storage medium may include a computer instruction, where when the computer instruction runs on UE, the UE performs the channel quality information reporting method in any one of the second aspect and the optional implementations of the second aspect.

According to a tenth aspect, a computer program product including an instruction is provided, where when the computer program product runs on UE, the UE performs the channel quality information reporting method in any one of the second aspect and the optional implementations of the second aspect.

For technical effects of the eighth aspect to the tenth aspect, refer to related descriptions of technical effects of any one of the second aspect and the optional implementations of the second aspect. Details are not described herein again.

According to an eleventh aspect, a communications system is provided, and the communications system includes the base station in any one of the third aspect and the optional implementations of the third aspect and the UE in any one of the fourth aspect and the optional implementations of the fourth aspect, or the communications system includes the base station in the fifth aspect and the UE in the eighth aspect.

For technical effects of the eleventh aspect, refer to related descriptions of technical effects of any one of the third aspect and the optional implementations of the third aspect, any one of the fourth aspect and the optional implementations of the fourth aspect, the fifth aspect, and the eighth aspect. Details are not described herein again.

DESCRIPTION OF EMBODIMENTS

Figure 1:
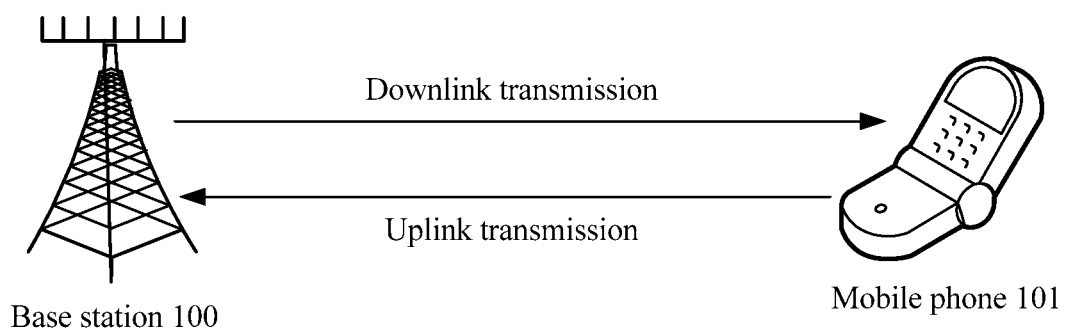
FIG. 1 is a schematic architectural diagram of a communications system according to an embodiment of the present invention.

The term "and/or" in this specification describes only an association relationship for describing associated objects and represents that three relationships may exist. For example, A and/or B may represent the following three cases: Only A exists, both A and B exist, and only B exists.

In the specification and claims of this application, the terms "first", "second", "third", "fourth", and so on are intended to distinguish between different objects but do not describe a particular order of the objects. For example, the first reporting granularity, the second reporting granularity, and the like are used to distinguish between different reporting granularities but do not describe a particular order of the reporting granularities.

In the embodiments of the present invention, the word such as "example" and "for example" is used to represent giving an example, an illustration, or a description. Any embodiment or design scheme described as an "example" in the embodiments of the present invention should not be explained as being more preferred or having more advantages than another embodiment or design scheme. Exactly, use of the word such as "example" is intended to present a related concept in a specific manner.

In the descriptions of the present invention, unless otherwise specified, "a plurality of" means two or more. For example, a plurality of shaped beams are two or more shaped beams.

The following first describes some concepts in a channel quality information reporting method, an apparatus, and a system provided in the embodiments of the present invention.

Channel quality information is a channel measurement result obtained by UE by measuring a downlink reference signal such as a channel state information-reference signal. In the embodiments of the present invention, in a process in which a base station sends a downlink reference signal to the UE by using a beamforming technology, channel quality information obtained by the UE through measurement may include at least one of a reference signal index or a beam index, and reference signal received power (RSRP), reference signal received quality (RSRQ), a channel quality indicator (CQI), and the like corresponding to the reference signal index or the beam index. One reference signal corresponds to one beam, and reference signal indexes are in a one-to-one correspondence with beam indexes.

Optionally, the channel quality information may be channel state information (CSI) in a Long Term Evolution (LTE) system, for example, at least one of a channel state information-reference signal index (CRI), a rank indication (RI), a precoding matrix indicator (PMI), a channel quality indicator (CQI), and the like. Alternatively, the channel quality information may be channel quality information measured through radio resource management (RRM), for example, at least one of RSRP, RSRQ, and the like. In addition, the channel quality information may be any one or more pieces of channel quality information other than the foregoing information, or may include any one or more pieces of channel quality information in addition to the foregoing information. This is not limited in the embodiments of the present invention.

It should be understood that, in the embodiments of the present invention, reporting the RSRP, the RSRQ, or the CQI by the UE usually means reporting an index value of the RSRP, the RSRQ, or the CQI by the UE.

Generally, in a process in which the base station sends a downlink signal to the UE by using the beamforming technology, to avoid a problem that the downlink signal sent by the base station possibly cannot reach the UE in a direction of a current shaped beam because the UE moves, and consequently receiving the downlink signal by the UE is frequently interrupted, the UE needs to report channel quality information obtained through measurement each time to the base station, so that the base station can select a new shaped beam based on the channel quality information reported by the UE. In this way, it is ensured that the downlink signal sent by the base station to the UE can successfully reach the UE in a direction of the new shaped beam. In the channel quality information reporting method, because the UE needs to report channel quality information to the base station after obtaining the channel quality information through measurement each time, the UE reports a relatively large quantity of pieces of channel quality information. Consequently, overheads for reporting the channel quality information by the UE may be relatively high. The downlink signal may be a downlink reference signal such as a channel state information-reference signal (CSI-RS), or may be any other downlink signal. This is not limited in the embodiments of the present invention.

To resolve the problem of relatively high overheads for reporting channel quality information by the UE, the embodiments of the present invention provide a channel quality information reporting method, an apparatus, and a system. In a process in which the base station sends a downlink signal to the UE by using the beamforming technology, the base station may determine a reporting manner of reporting channel quality information by the UE, and then the base station receives the channel quality information reported by the UE in the reporting manner, and demodulates, based on the reporting manner, the channel quality information received by the base station. In the embodiments of the present invention, because the base station and the UE can flexibly and adaptively agree on a reporting manner of reporting channel quality information by the UE, the agreed reporting manner can better adapt to a requirement of reporting the channel quality information by the UE, so that the UE reports the channel quality information in the agreed reporting manner, thereby reducing overheads for reporting the channel quality information by the UE.

FIG. 1 is a schematic architectural diagram of a communications system according to an embodiment of the present invention. As shown in FIG. 1, the communications system includes a base station 100 and UE 101. The base station sends a downlink signal to the UE by using a beamforming technology.

Figure 2:
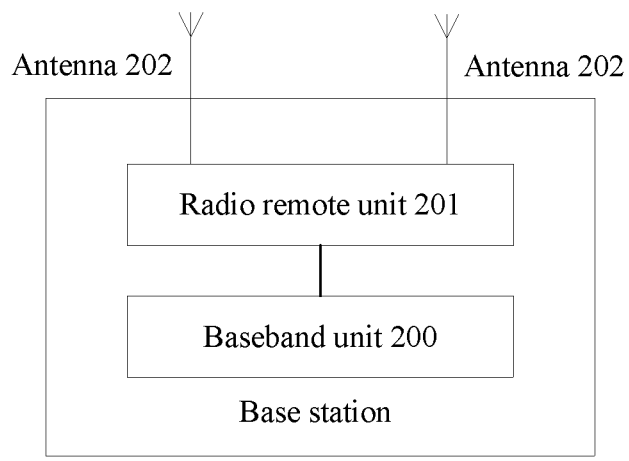
FIG. 2 is a schematic structural diagram of hardware of a base station according to an embodiment of the present invention.

FIG. 2 is a schematic diagram of hardware of a base station according to an embodiment of the present invention. The base station shown in FIG. 2 includes a baseband unit (BBU) 200, a radio remote unit (RRU) 201, and an antenna 202. The BBU 200 is connected to the RRU 201 by using a fiber, and the RRU 201 is further connected to the antenna 202 by using a coaxial cable and a power splitter (coupler). One BBU 200 may usually be connected to a plurality of RRU 201.

The BBU 200 is configured to complete baseband processing functions (encoding, multiplexing, modulation, spread spectrum, and the like) of a Uu interface (namely, an interface between UE and the base station), an interface function of a logical interface between a radio network controller (RNC) and the base station, a signaling processing function, local and remote operation and maintenance functions, and working status monitoring and alarm information reporting functions of a base station system.

The RRU 201 may include four modules: a digital intermediate frequency module, a transceiver module, a power amplifier module, and a filter module. The digital intermediate frequency module is configured to perform modulation and demodulation of optical transmission, digital up- and down-frequency conversion, digital-to-analog conversion, and the like. The transceiver module completes conversion from an intermediate frequency signal to a radio frequency signal. After being amplified by the power amplifier module and filtered by the filter module, the radio frequency signal is transmitted by using the antenna.

UE in the embodiments of the present invention may be a mobile phone, a tablet computer, a notebook computer, an ultra-mobile personal computer (UMPC), a netbook, a personal digital assistant (PDA), or the like.

Figure 3:
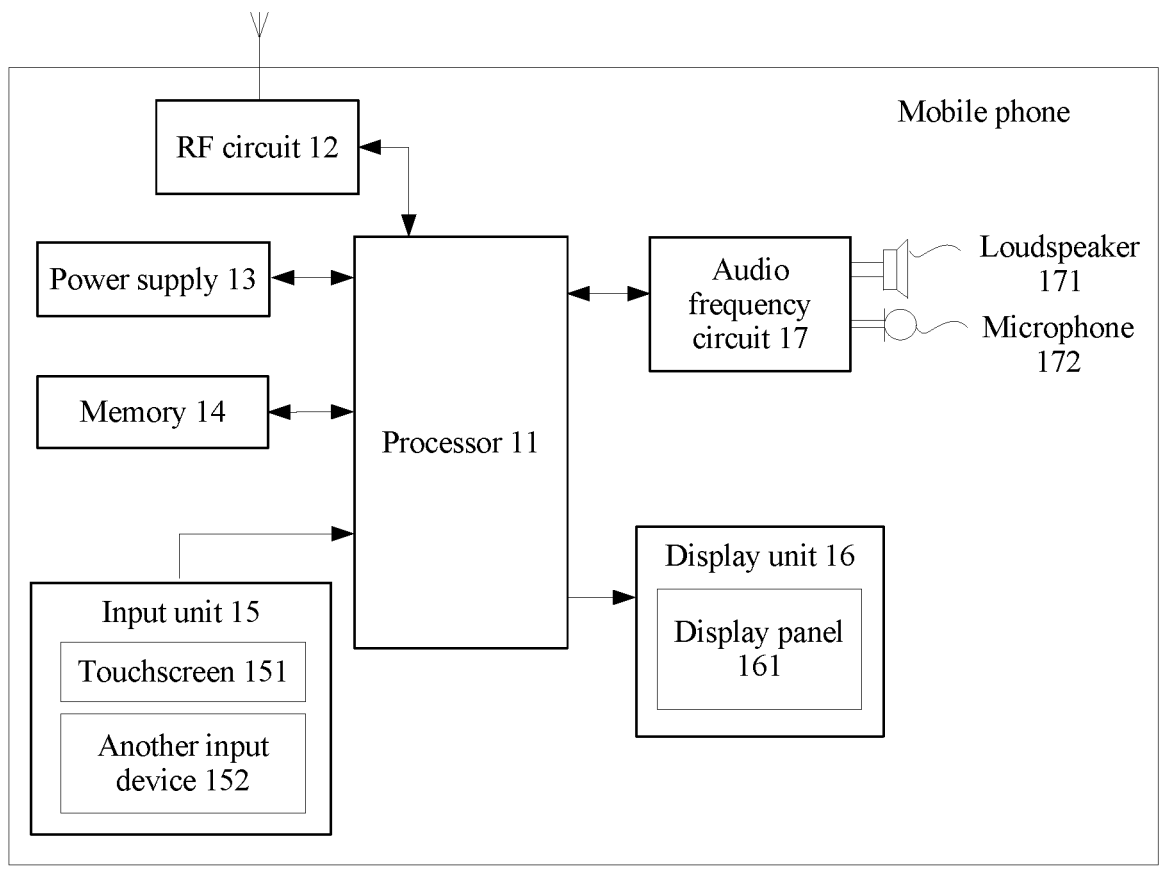
FIG. 3 is a schematic structural diagram of hardware of a mobile phone according to an embodiment of the present invention.

For example, the UE in the embodiments of the present invention may be the mobile phone shown in FIG. 1. The following describes each component of the mobile phone in the embodiments of the present invention in detail with reference to FIG. 3. As shown in FIG. 3, the mobile phone provided in the embodiments of the present invention includes components such as a processor 11, a radio frequency (RF) circuit 12, a power supply 13, a memory 14, an input unit 15, a display unit 16, and an audio frequency circuit 17. A person skilled in the art may understand that a structure of the mobile phone shown in FIG. 3 does not constitute a limitation to a mobile phone, and the mobile phone may include more or fewer components than the components shown in FIG. 3, or may include a combination of some of the components shown in FIG. 3, or may include components disposed differently from the components shown in FIG. 3.

The processor 11 is a control center of the mobile phone, uses various interfaces and lines to connect all parts of the entire mobile phone, and performs various functions and data processing of the mobile phone by running or executing a software program and/or a module stored in the memory 14 and invoking data stored in the memory 14, so as to perform overall monitoring on the mobile phone. Optionally, the processor 11 may include one or more processing units. Preferably, an application processor and a modem processor may be integrated into the processor 11. The application processor mainly processes an operating system, a user interface, an application program, and the like. The modem processor mainly processes wireless communication. It may be understood that the modem processor may not be integrated into the processor 11.

The RF circuit 12 may be configured to receive and send information, or receive and send a signal during a call. In particular, after receiving downlink information from a base station, the RF circuit 12 sends the downlink information to the processor 11 for processing. In addition, the RF circuit 12 sends uplink data to the base station. Generally, the RF circuit includes but is not limited to an antenna, at least one amplifier, a transceiver, a coupler, a low noise amplifier (LNA), a duplexer, or the like. In addition, the RF circuit 12 may communicate with a network and another device through wireless communication. Any communication standard or protocol may be used for the wireless communication, and includes but is not limited to a Global System for Mobile Communications (GSM), a general packet radio service (GPRS), Code Division Multiple Access (CDMA), Wideband Code Division Multiple Access (WCDMA), Long Term Evolution (LTE), an email, a short message service (SMS), or the like.

The mobile phone includes the power supply 13 (such as a battery) that supplies power to each component. Optionally, the power supply may be logically connected to the processor 11 by using a power management system, so as to implement functions such as charging and discharging management and power consumption management by using the power management system.

The memory 14 may be configured to store a software program and a module. By running the software program and the module that are stored in the memory 14, the processor 11 performs various function applications and data processing of the mobile phone. The memory 14 may mainly include a program storage area and a data storage area. The program storage area may store an operating system, an application program required by at least one function (such as a sound play function or an image play function), and the like. The data storage area may store data (such as audio data, image data, or an address book) created based on use of the mobile phone, and the like. In addition, the memory 14 may include a high-speed random access memory, or may include a nonvolatile memory, such as at least one magnetic disk storage device, a flash memory device, or another volatile solid-state storage device.

The input unit 15 may be configured to: receive entered digital or character information, and generate key signal input related to user setting and function control of the mobile phone. Specifically, the input unit 15 may include a touchscreen 151 and another input device 152. The touchscreen 151, also referred to as a touch panel, may collect a touch operation performed by a user on or near the touchscreen 151 (such as an operation performed by the user on or near the touchscreen 151 by using any proper object or accessory, such as a finger or a stylus), and drive a corresponding connection apparatus based on a preset program. Optionally, the touchscreen 151 may include two parts: a touch detection apparatus and a touch controller. The touch detection apparatus detects a touch orientation of the user, detects a signal brought by the touch operation, and transmits the signal to the touch controller. The touch controller receives touch information from the touch detection apparatus, converts the touch information into touch point coordinates, and sends the touch point coordinates to the processor 11, and can receive and execute a command sent by the processor 11. In addition, the touchscreen 151 may be implemented by using a plurality of types such as a resistive type, a capacitive type, an infrared ray, and a surface acoustic wave. The another input device 152 may include but is not limited to one or more of a physical keyboard, a function key (such as a volume control key or an on/off key), a trackball, a mouse, a joystick, and the like.

The display unit 16 may be configured to display information entered by the user or information provided for the user, and various menus of the mobile phone. The display unit 16 may include a display panel 161. Optionally, the display panel 161 may be configured in a form such as a liquid crystal display (LCD) or an organic light-emitting diode (OLED). Further, the touchscreen 151 may cover the display panel 161. After detecting a touch operation on or near the touchscreen 151, the touchscreen 141 transmits the touch operation to the processor 11 to determine a type of a touch event, and then the processor 11 provides corresponding visual output on the display panel 161 based on the type of the touch event. Although the touchscreen 151 and the display panel 151 in FIG. 3 are used as two independent components to implement input and output functions of the mobile phone, in some embodiments, the touchscreen 151 and the display panel 161 may be integrated to implement the input and output functions of the mobile phone.

The audio frequency circuit 17, a loudspeaker 171, and a microphone 172 are configured to provide an audio interface between the user and the mobile phone. The audio frequency circuit 17 may transmit, to the loudspeaker 171, an electrical signal converted from received audio data, and the loudspeaker 171 converts the electrical signal into a sound signal for output. In addition, the microphone 172 converts a collected sound signal into an electrical signal, and the audio frequency circuit 17 receives the electrical signal, converts the electrical signal into audio data, and outputs the audio data to the RF circuit 12 to send the audio data to, for example, another mobile phone, or outputs the audio data to the memory 14 for further processing.

Optionally, the mobile phone shown in FIG. 3 may further include various sensors, for example, a gyro sensor, a hygrometer sensor, an infrared sensor, and a magnetometer sensor. Details are not described herein.

Optionally, the mobile phone shown in FIG. 3 may further include a Wireless Fidelity (WiFi) module, a Bluetooth module, and the like. Details are not described herein.

To better understand the technical solutions in the embodiments of the present invention, three of the embodiments of the present invention are used to provide example descriptions of the channel quality information reporting method provided in the embodiments of the present invention. Specifically, in Embodiment 1, a base station may obtain a reporting manner of reporting channel quality information by UE, and configure the reporting manner for the UE, so that the UE can report the channel quality information to a base station in the reporting manner (a channel quality information reporting method shown in FIG. 4). In Embodiment 2, UE obtains a reporting manner of reporting channel quality information by the UE, and reports the channel quality information to a base station in the reporting manner (a channel quality information reporting method shown in FIG. 5). In Embodiment 3, a base station and UE separately obtain a predefined reporting manner of reporting channel quality information by the UE, and the UE reports the channel quality information to a base station in the reporting manner (the channel quality information reporting method shown in FIG. 6).

Embodiment 1

Figure 4:
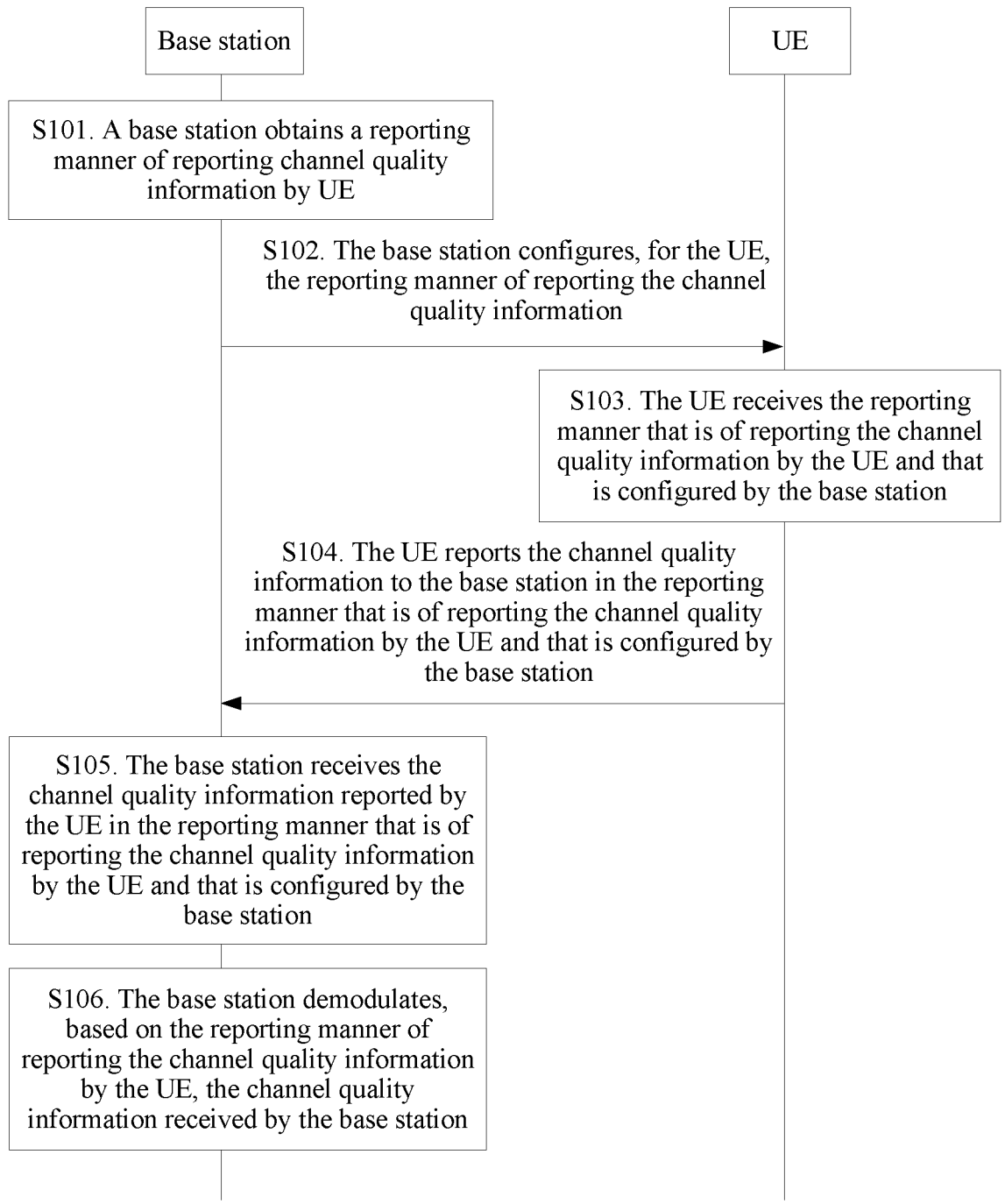
FIG. 4 is a schematic diagram 1 of a channel quality information reporting method according to an embodiment of the present invention.

With reference to FIG. 1, as shown in FIG. 4, this embodiment of the present invention provides a channel quality information reporting method. The method may include the following steps.

S101. A base station obtains a reporting manner of reporting channel quality information by UE.

In this embodiment of the present invention, when the UE reports the channel quality information to the base station, the UE needs to report the channel quality information to a base station in the reporting manner that is of reporting the channel quality information by the UE and that is agreed on by the UE and the base station. Then the base station may demodulate, based on the reporting manner, the channel quality information reported by the UE. The reporting manner of reporting the channel quality information by the UE may be obtained by the base station. Specifically, the base station may determine the reporting manner of reporting the channel quality information by the UE.

Optionally, in this embodiment of the present invention, the reporting manner may be at least one of a reporting granularity, a reporting range, and a reporting mode.

Optionally, with reference to FIG. 4, in this embodiment of the present invention, when the reporting manner is the reporting granularity, the reporting granularity may be specifically determined by using the following method:

The base station may divide a value range of the channel quality information into a plurality of intervals, and a length of each interval is referred to as one reporting granularity.

In this embodiment of the present invention, to ensure reporting granularity consistency, the base station may evenly divide the value range of the channel quality information into a plurality of intervals.

Certainly, the value range of the channel quality information may be unevenly divided. After the base station unevenly divides the value range of the channel quality information into a plurality of intervals, there may be at least two reporting granularities of the channel quality information. For example, the base station first divides the value range of the channel quality information into two parts, and then evenly divides each of the two parts into a plurality of intervals. In this case, a length of each interval in a first part may be referred to as a reporting granularity A, and a length of each interval in a second part may be referred to as a reporting granularity B. The reporting granularity A may be unequal to the reporting granularity B. For example, the reporting granularity A is greater than the reporting granularity B, or the reporting granularity A is less than the reporting granularity B.

For example, in this embodiment of the present invention, if the value range of the channel quality information is [0, 100], if the base station evenly divides the value range into 100 intervals, and a length of each interval is 1, the base station learns that the reporting granularity is 1; or if the base station evenly divides the value range into 50 intervals, and a length of each interval is 2, the base station learns that the reporting granularity is 2. It can be learned that if the base station divides the value range of the channel quality information into fewer intervals, the base station obtains a larger reporting granularity, and fewer bits are required by the UE to report the channel quality information. In this way, overheads for reporting the channel quality information by the UE can be reduced.

After the base station divides the value range of the channel quality information into a plurality of intervals, each interval may correspond to one reporting index value.

Optionally, the reporting granularity of the channel quality information may include a first reporting granularity and a second reporting granularity. Specifically, when the UE reports the channel quality information to the base station by using a physical uplink control channel, a reporting granularity of the channel quality information is the first reporting granularity; or when the UE reports the channel quality information to the base station by using a physical uplink shared channel, a reporting granularity of the channel quality information is the second reporting granularity. The first reporting granularity is greater than or equal to the second reporting granularity.

In this embodiment of the present invention, the physical uplink control channel has limited resources compared with the physical uplink shared channel. Therefore, the base station may determine the larger first reporting granularity for reporting the channel quality information by the UE to the base station by using the physical uplink control channel, so that overheads for reporting the channel quality information by the UE to the base station can be reduced, and resources of the physical uplink control channel can be further reduced. In addition, the base station may determine the smaller second reporting granularity for reporting the channel quality information by the UE to the base station by using the physical uplink shared channel, so that accuracy of reporting the channel quality information by the UE to the base station can be improved.

Optionally, the base station may determine the reporting granularity based on different scenarios and requirements. For example, in a process in which the UE selects a shaped beam, when the UE initially scans a shaped beam, the base station may determine a relatively large reporting granularity (also referred to as a coarse granularity) for selecting a shaped beam by the UE based on the coarse granularity. In a shaped beam modification and optimization phase, the base station may configure a relatively small reporting granularity (also referred to as a fine granularity) for accurately selecting a shaped beam by the UE based on the fine granularity.

When the base station has no prior information, for example, when the base station receives no channel quality information reported by the UE, the base station may determine a relatively large reporting granularity. When the base station receives channel quality information reported by the UE, the base station determines a reporting range of the channel quality information based on sizes of channel quality information reported by the UE for a plurality of consecutive times, and determines a relatively small reporting granularity within the reporting range.

Optionally, with reference to FIG. 4, the base station may determine the reporting range of reporting the channel quality information by the UE. Specifically, the base station determines a first preset threshold and a second preset threshold based on shaped beam energy information, where the second preset threshold is greater than or equal to the first preset threshold, and determines a range "greater than or equal to the first preset threshold and less than or equal to the second preset threshold" of the channel quality information as the reporting range of reporting the channel quality information by the UE.

In this embodiment of the present invention, the reporting range may include a first reporting range and a second reporting range, the first reporting range is a reporting range of reporting the channel quality information by the UE on the physical uplink control channel, the second reporting range is a reporting range of reporting the channel quality information by the UE on the physical uplink shared channel, and the first reporting range is less than or equal to the second reporting range.

In this embodiment of the present invention, the physical uplink control channel has limited resources compared with the physical uplink shared channel. Therefore, the base station may determine the smaller first reporting range for reporting the channel quality information by the UE to the base station by using the physical uplink control channel, so that overheads for reporting the channel quality information by the UE to the base station can be reduced, and resources of the physical uplink control channel can be further reduced. In addition, the base station may configure the larger second reporting range for reporting the channel quality information by the UE to the base station by using the physical uplink shared channel, so that accuracy of reporting the channel quality information by the UE to the base station can be improved.

Optionally, with reference to FIG. 4, the base station may determine the reporting mode of reporting the channel quality information by the UE. Specifically, the reporting mode may include a first reporting mode and a second reporting mode, the first reporting mode is a reporting mode of reporting the channel quality information by the UE on the physical uplink shared channel, the second reporting mode is a reporting mode of reporting the channel quality information by the UE on the physical uplink control channel, and a quantity of bits for reporting the channel quality information by the UE in the first reporting mode is greater than or equal to a quantity of bits for reporting the channel quality information by the UE in the second reporting mode.

The first reporting mode may be a non-differential reporting mode, and the second reporting mode may be a differential reporting mode. When the base station determines that channel quality information reported by the UE previous time is received, the base station determines that a reporting mode of reporting channel quality information by the UE next time may be a differential reporting mode, and the UE reports a difference value between current channel quality information and the previous channel quality information to the base station. When the base station determines that channel quality information reported by the UE previous time is not received, the base station determines that a reporting mode of reporting channel quality information by the UE next time may be a non-differential reporting mode, and the UE reports all current channel quality information to the base station.

In this embodiment of the present invention, the physical uplink control channel has limited resources compared with the physical uplink shared channel. Therefore, the base station may determine, for reporting the channel quality information by the UE to the base station by using the physical uplink control channel, the second reporting mode requiring a smaller quantity of feedback bits (a quantity of bits for reporting the channel quality information by the UE), so that overheads for reporting the channel quality information by the UE to the base station can be reduced, and resources of the physical uplink control channel can be further reduced. In addition, the base station may determine, for reporting the channel quality information by the UE to the base station by using the physical uplink shared channel, the first reporting mode requiring a larger quantity of feedback bits (a quantity of bits for reporting the channel quality information by the UE), so that accuracy of reporting the channel quality information by the UE to the base station can be improved.

S102. The base station configures, for the UE, the reporting manner of reporting the channel quality information.

In this embodiment of the present invention, after the base station obtains the reporting manner of reporting the channel quality information by the UE, the base station needs to configure the reporting manner for the UE, so that the UE can report the channel quality information to a base station in the reporting manner.

Optionally, in this embodiment of the present invention, that the base station configures, for the UE, the reporting manner of reporting the channel quality information may be specifically that the base station sends higher layer signaling and/or physical layer control signaling including indication information of the reporting manner to the UE, so that after receiving the higher layer signaling and/or the physical layer control signaling, the UE can determine the reporting manner based on the indication information in the higher layer signaling and/or the physical layer control signaling, and then the UE can report the channel quality information to a base station in the reporting manner.

It should be noted that when the base station determines that the reporting manner of reporting the channel quality information by the UE is the differential reporting mode, that the base station configures the reporting manner for the UE may be specifically that the base station adds 1 bit to the higher layer signaling and/or the physical layer control signaling sent to the UE, to indicate that the reporting manner is the differential reporting mode, so that the UE can report the channel quality information to the base station in the reporting manner.

S103. The UE receives the reporting manner that is of reporting the channel quality information by the UE and that is configured by the base station.

S104. The UE reports the channel quality information to the base station in the reporting manner that is of reporting the channel quality information by the UE and that is configured by the base station.

In this embodiment of the present invention, after receiving the reporting manner that is of reporting the channel quality information by the UE and that is configured by the base station, the UE may report the channel quality information to the base station in the reporting manner.

Optionally, in this embodiment of the present invention, when the reporting manner received by the UE is the reporting granularity, the UE reports the channel quality information by using the reporting granularity. If the base station divides the value range of the channel quality information into fewer intervals, the base station obtains a larger reporting granularity, and fewer bits are required by the UE to report the channel quality information. In this way, overheads for reporting the channel quality information by the UE can be reduced.

Optionally, in this embodiment of the present invention, when the reporting manner received by the UE is the reporting range, the UE reports the channel quality information by using the reporting range. The UE reports channel quality information that falls within the reporting range and that is obtained through measurement to the base station, but does not need to report channel quality information beyond the reporting range to the base station, so that a quantity of pieces of channel quality information reported and a quantity of times of reporting by the UE to the base station can be reduced, thereby reducing overheads for reporting the channel quality information by the UE to the base station.

Optionally, in this embodiment of the present invention, when the reporting manner received by the UE is the reporting mode, the UE reports the channel quality information in the reporting mode. The reporting mode may include the first reporting mode and the second reporting mode, the first reporting mode may be specifically the non-differential reporting mode, and the second reporting mode may be specifically the differential reporting mode. When the reporting mode is the differential reporting mode, the UE may report the channel quality information to the base station based on the differential reporting mode. Specifically, the UE reports, to the base station, a difference between channel quality information obtained through current measurement and channel quality information obtained by the UE through previous measurement, and the UE does not need to report absolute information of the channel quality information (namely, a specific value of the channel quality information) obtained through the current measurement to the base station. In this way, a quantity of pieces of channel quality information reported by the UE is relatively small, so that overheads for reporting the channel quality information by the UE to the base station can be reduced.

Optionally, when the base station sends a downlink signal to the UE by using a plurality of shaped beams, the UE needs to report both an average value and an optimal value (namely, a largest value) of a plurality of pieces of channel quality information to the base station. The UE may report average channel quality information and a difference between the average channel quality information and optimal channel quality information to the base station, and the UE does not need to report absolute information of the optimal channel quality information to the base station; or the UE may report optimal channel quality information and a difference between average channel quality information and the optimal channel quality information to the base station, and the UE does not need to report absolute information of the average channel quality information to the base station. In this way, a quantity of pieces of channel quality information reported by the UE is relatively small, so that overheads for reporting the channel quality information by the UE to the base station can be reduced.

It should be understood that the difference (for example, the difference between the average channel quality information and the optimal channel quality information) may be an index value of the difference.

In this embodiment of the present invention, the UE may report the channel quality information to the base station on the physical uplink control channel, or may report the channel quality information to the base station on the physical uplink shared channel, or may report the channel quality information to the base station on the physical uplink control channel and the physical uplink shared channel. A specific channel may be selected based on an actual use requirement. This is not limited in this embodiment of the present invention.

S105. The base station receives the channel quality information reported by the UE in the reporting manner that is of reporting the channel quality information by the UE and that is configured by the base station.

Optionally, in this embodiment of the present invention, the base station may receive, from a physical channel, the channel quality information reported by the UE. The physical channel includes at least one of the physical uplink control channel and the physical uplink shared channel.

In this embodiment of the present invention, when the UE reports the channel quality information to the base station on the physical uplink control channel, the base station receives, from the physical uplink control channel, the channel quality information reported by the UE; or when the UE reports the channel quality information to the base station on the physical uplink control channel, the base station receives, from the physical uplink shared channel, the channel quality information reported by the UE.

S106. The base station demodulates, based on the reporting manner of reporting the channel quality information by the UE, the channel quality information received by the base station.

In this embodiment of the present invention, after the base station receives the channel quality information reported by the UE in the reporting manner, the base station needs to demodulate, based on the reporting manner, the channel quality information received by the base station, so that the base station can determine, based on the channel quality information reported by the UE, whether to use a new shaped beam to send a downlink signal to the UE. In this way, it is ensured that the downlink signal sent by the base station to the UE can successfully reach the UE.

According to the channel quality information reporting method provided in this embodiment of the present invention, in a process in which the base station sends the downlink signal to the UE by using a beamforming technology, the base station may determine the reporting manner of reporting the channel quality information by the UE (the reporting manner may include at least one of the reporting granularity of the channel quality information, the reporting range of the channel quality information, and the reporting mode of the channel quality information), and then configures the reporting manner for the UE; the UE receives the reporting manner configured by the base station, and then may report the channel quality information to the base station in the reporting manner; and the base station receives the channel quality information reported by the UE, and demodulates the channel quality information based on the reporting manner. In comparison with the prior art, in this embodiment of the present invention, because the base station and the UE can flexibly and adaptively agree on a reporting manner of reporting channel quality information by the UE, the agreed reporting manner can better adapt to a requirement of reporting the channel quality information by the UE, so that the UE reports the channel quality information in the agreed reporting manner, thereby reducing overheads for reporting the channel quality information by the UE.

Embodiment 2

Figure 5:
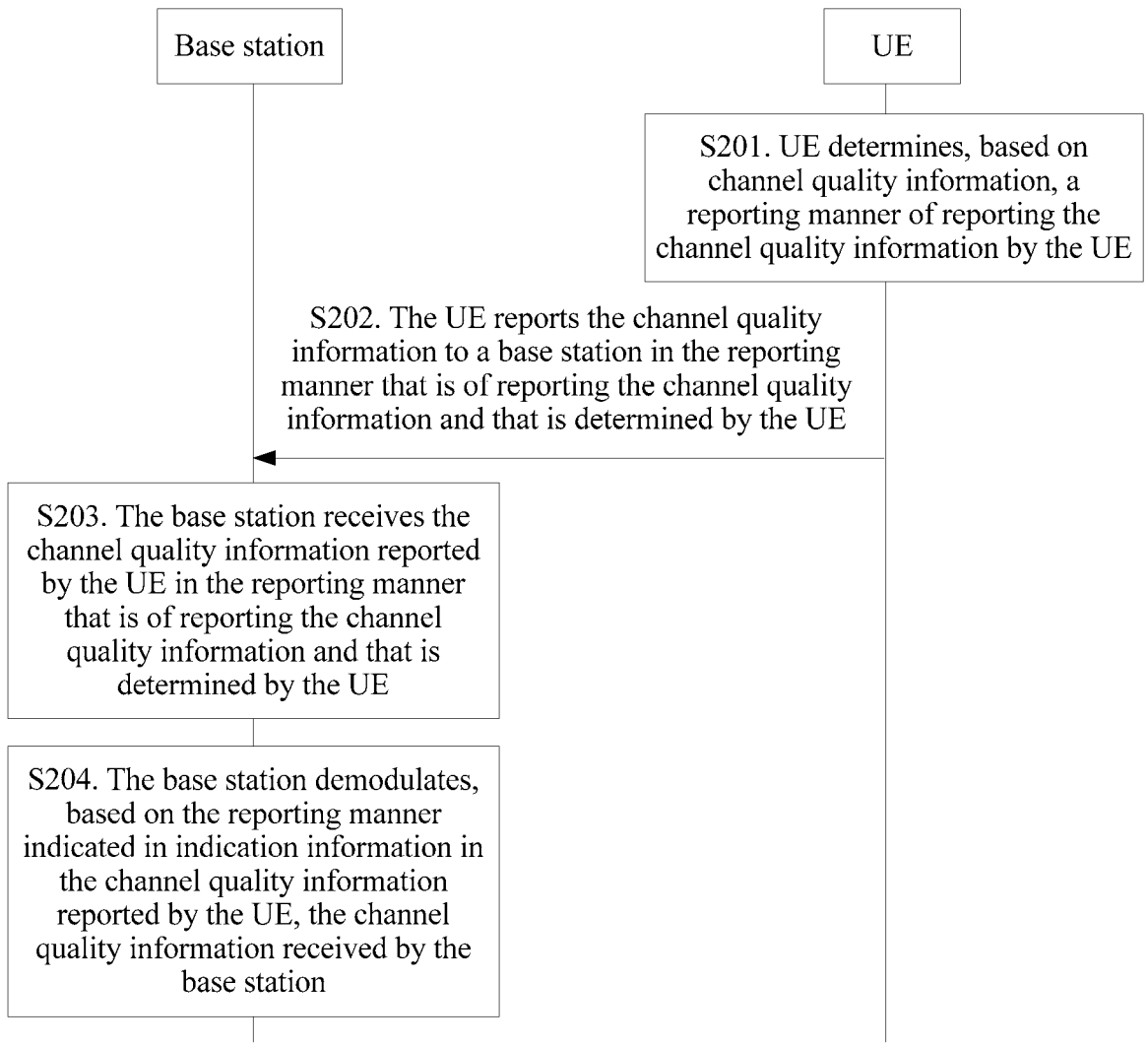
FIG. 5 is a schematic diagram 2 of a channel quality information reporting method according to an embodiment of the present invention.

With reference to FIG. 1, as shown in FIG. 5, this embodiment of the present invention provides a channel quality information reporting method. The method may include the following steps.

S201. UE determines, based on channel quality information, a reporting manner of reporting the channel quality information by the UE.

In this embodiment of the present invention, the channel quality information may be a channel measurement result obtained by the UE by measuring a downlink channel reference signal.

Optionally, in this embodiment of the present invention, the reporting manner may be at least one of a reporting granularity, a reporting range, and a reporting mode. For descriptions of the reporting manner, refer to the specific descriptions of the reporting manner in S101, and details are not described herein again.

Optionally, in this embodiment of the present invention, the UE determines, based on whether a range of channel quality information obtained by the UE through measurement in a period of time is fixedly converged into a smaller range, whether the reporting granularity or the reporting range of reporting the channel quality information by the UE needs to be adjusted.

Optionally, in this embodiment of the present invention, the reporting mode includes a first reporting mode and a second reporting mode. The first reporting mode may be the non-differential reporting mode in S101, or may be any other reporting mode requiring a relatively large quantity of feedback bits. For example, channel quality information corresponding to the first reporting mode includes at least two of a reference signal index or a beam index, reference signal received power, and a channel quality indicator. The second reporting mode may be the differential reporting mode in S101, or may be any other reporting mode requiring a relatively small quantity of feedback bits. Channel quality information corresponding to the second reporting mode is a subset of the channel quality information corresponding to the first reporting mode. For example, a feedback amount corresponding to the second reporting mode includes one of the reference signal index or the beam index, the reference signal received power, and the channel quality indicator.

S202. The UE reports the channel quality information to a base station in the reporting manner that is of reporting the channel quality information and that is determined by the UE.

In this embodiment of the present invention, the channel quality information reported by the UE to the base station includes indication information of the reporting manner, and the indication information is used to indicate, to the base station, the reporting manner currently used by the UE to report the channel quality information, so that the base station can learn of the reporting manner of reporting the channel quality information by the UE.

Optionally, when the reporting manner is the reporting granularity, there is a predefined reporting granularity set on a base station side and a UE side. The UE also reports an index number of a reporting granularity in the reporting granularity set when reporting the channel quality information. It should be noted that the channel quality information is channel quality information corresponding to the reporting granularity.

Optionally, when the reporting manner is the reporting range, there is a predefined reporting range set on a base station side and a UE side. The UE also reports an index number of a reporting range in the reporting range set when reporting the channel quality information. It should be noted that the channel quality information is channel quality information within the reporting range.

Optionally, when the reporting manner is the reporting mode, the UE also reports indication information of the reporting mode when reporting the channel quality information. It should be noted that the channel quality information is channel quality information corresponding to the reporting mode.

It should be noted that when the UE reports the channel quality information to the base station, the UE may reserve one or more bits in the channel quality information reported by the UE, and set indication information in the reserved one or more bits. The indication information is used to indicate, to the base station, a reporting mode currently used by the UE to report the channel quality information.

For example, when the reporting manner is the reporting mode, the UE may reserve 1 bit in the channel quality information reported by the UE. The UE sets "1" in the 1 bit to indicate that the reporting mode currently used by the UE to report the channel quality information is the first reporting mode, or may set "0" to indicate that the reporting mode currently used by the UE to report the channel quality information is the second reporting mode. If "1" is used to indicate that the reporting mode currently used by the UE to report the channel quality information is the first reporting mode, "0" may be used to indicate that the reporting mode currently used by the UE to report the channel quality information is the second reporting mode. Certainly, in this embodiment of the present invention, another flag that meets an actual use requirement may be used to set the indication information, and examples are not listed one by one in this embodiment of the present invention.

S203. The base station receives the channel quality information reported by the UE in the reporting manner that is of reporting the channel quality information and that is determined by the UE.

For specific descriptions of S203, refer to the related descriptions of S105, and details are not described herein again.

S204. The base station demodulates, based on the reporting manner indicated in indication information in the channel quality information reported by the UE, the channel quality information received by the base station.

In this embodiment of the present invention, because the channel quality information received by the base station includes the indication information of the reporting manner, the base station may demodulate, based on the reporting manner indicated in the indication information, the channel quality information received by the base station, so that the base station can determine, based on the channel quality information reported by the UE, whether to use a new shaped beam to send a downlink signal to the UE. In this way, it is ensured that the downlink signal sent by the base station to the UE can successfully reach the UE.

According to the channel quality information reporting method provided in this embodiment of the present invention, in a process in which the base station sends the downlink signal to the UE by using a beamforming technology, the UE may determine the reporting manner of reporting the channel quality information by the UE (the reporting manner may include at least one of the reporting granularity, the reporting range, and the reporting mode); then the UE may report the channel quality information including the indication information of the reporting manner to the base station in the reporting manner; and the base station receives the channel quality information reported by the UE, and demodulates the channel quality information based on the reporting manner indicated by the indication information. In comparison with the prior art, in this embodiment of the present invention, because the base station and the UE can flexibly and adaptively agree on a reporting manner of reporting channel quality information by the UE, the agreed reporting manner can better adapt to a requirement of reporting the channel quality information by the UE, so that the UE reports the channel quality information in the agreed reporting manner, thereby reducing overheads for reporting the channel quality information by the UE.

Embodiment 3

Figure 6:
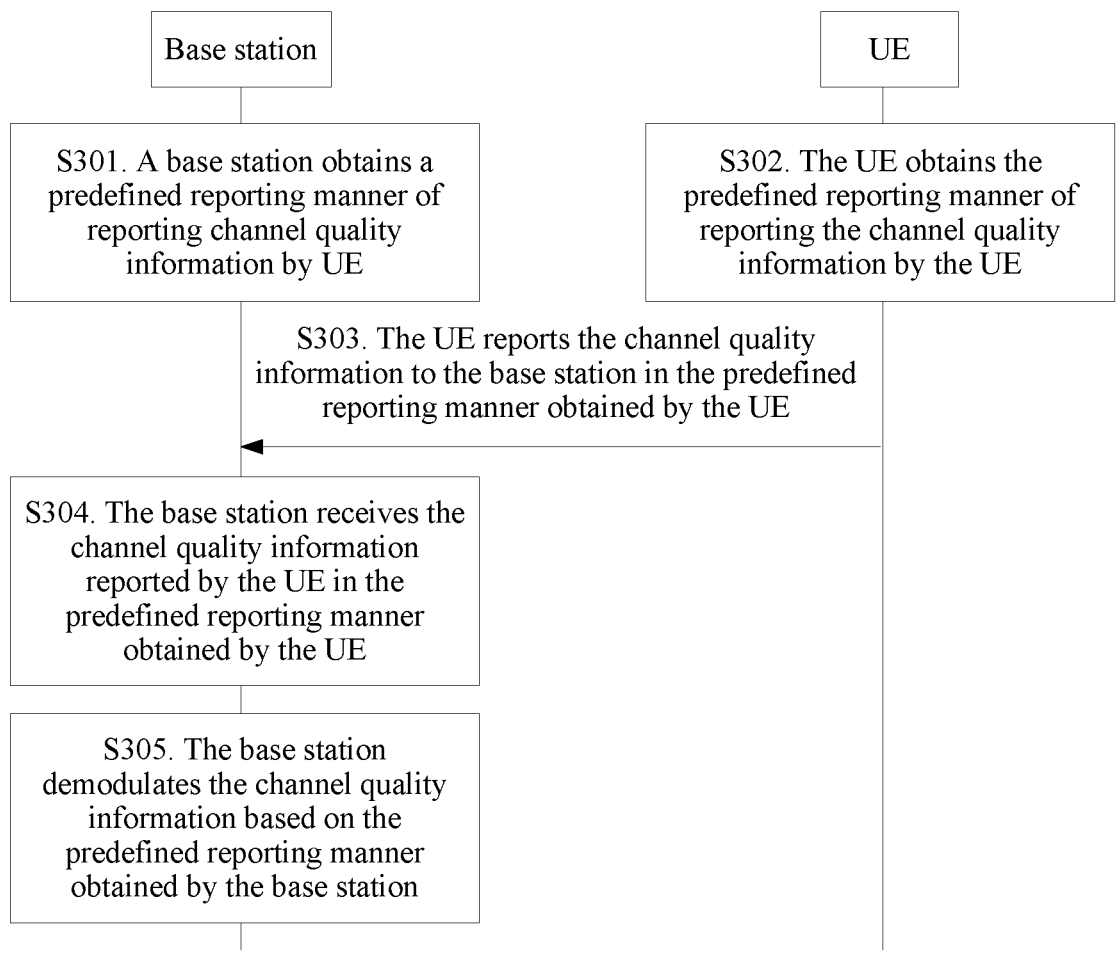
FIG. 6 is a schematic diagram 3 of a channel quality information reporting method according to an embodiment of the present invention.

With reference to FIG. 1, as shown in FIG. 6, this embodiment of the present invention provides a channel quality information reporting method. The method may include the following steps.

S301. A base station obtains a predefined reporting manner of reporting channel quality information by UE.

S302. The UE obtains the predefined reporting manner of reporting the channel quality information by the UE.

In this embodiment of the present invention, the reporting manner is predefined. Specifically, the reporting manner may be predefined (prestored) in the base station and the UE, and the predefined reporting manner obtained by the base station is the same as the predefined reporting manner obtained by the UE, so that when the UE reports the channel quality information in the predefined reporting manner, the base station can learn of the reporting manner of reporting the channel quality information by the UE.

Optionally, in this embodiment of the present invention, the reporting manner of reporting the channel quality information by the UE may be predefined in the UE and the base station based on a type of a channel for transmitting the channel quality information by the UE. The reporting manner may include at least one of a reporting granularity, a reporting range, and a reporting mode.

The type of the channel for transmitting the channel quality information by the UE may be a physical uplink control channel or a physical uplink shared channel, or may be any other physical uplink channel. This is not limited in this embodiment of the present invention.

It should be noted that an execution order of performing S301 and S302 may not be limited in this embodiment of the present invention. In other words, in this embodiment of the present invention, S301 may be performed before S302, or S302 may be performed before S301, or S301 and S302 may be performed at the same time.

S303. The UE reports the channel quality information to the base station in the predefined reporting manner obtained by the UE.

For specific descriptions of S303, refer to the related descriptions of reporting the channel quality information by the UE to the base station in S104, and details are not described herein again.

S304. The base station receives the channel quality information reported by the UE in the predefined reporting manner obtained by the UE.

S305. The base station demodulates the channel quality information based on the predefined reporting manner obtained by the base station.

For specific descriptions of S304 and S305, refer to the related descriptions of S105 and S106, and details are not described herein again.

According to the channel quality information reporting method provided in this embodiment of the present invention, in a process in which the base station sends a downlink signal to the UE by using a beamforming technology, the base station and the UE may separately obtain the predefined reporting manner of reporting the channel quality information by the UE (the reporting manner may include at least one of the reporting granularity, the reporting range, and the reporting mode); then the UE may report the channel quality information to the base station in the reporting manner; and the base station receives the channel quality information reported by the UE, and demodulates the channel quality information based on the reporting manner. In comparison with the prior art, in this embodiment of the present invention, because the base station and the UE can flexibly and adaptively agree on a reporting manner of reporting channel quality information by the UE, the agreed reporting manner can better adapt to a requirement of reporting the channel quality information by the UE, so that the UE reports the channel quality information in the agreed reporting manner, thereby reducing overheads for reporting the channel quality information by the UE.

The foregoing mainly describes the solutions provided in the embodiments of the present invention from a perspective of interaction between devices. It may be understood that, to implement the foregoing functions, devices such as the base station and the UE include corresponding hardware structures and/or software modules for performing each function. A person skilled in the art should easily be aware that in combination with the examples described in the embodiments disclosed in this specification, units and algorithm steps may be implemented in a form of hardware or in a form of a combination of hardware and computer software. Whether a function is performed by hardware or computer software by driving hardware depends on particular applications and design constraint conditions of the technical solutions. A person skilled in the art may use different methods to implement the described functions for each particular application, but it should not be considered that the implementation goes beyond the scope of the present invention.

In the embodiments of the present invention, function module division may be performed on the base station and the UE based on the foregoing method example. For example, each function module may be obtained through division based on a corresponding function, or two or more functions may be integrated into one processing module. The integrated module may be implemented in a form of hardware, or may be implemented in a form of a software functional module. It should be noted that the module division in the embodiments of the present invention is an example, and is merely logical function division, and there may be another division manner in actual implementation.

Figure 7:
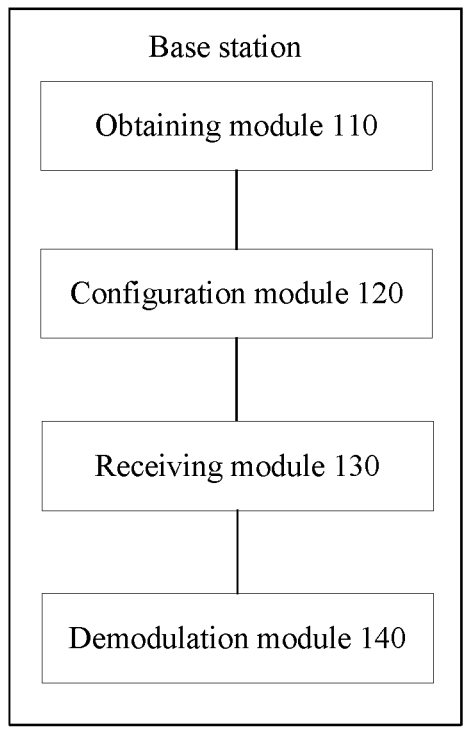
FIG. 7 is a schematic structural diagram 1 of a base station according to an embodiment of the present invention.

An embodiment of the present invention provides a base station. When each function module is obtained through division based on a corresponding function, FIG. 7 is a possible schematic structural diagram of the base station in the foregoing embodiment. The base station includes an obtaining module 110, a configuration module 120, a receiving module 130, and a demodulation module 140. The obtaining module 110 is configured to support the base station in performing S101 and S301 in the foregoing method embodiments. The configuration module 120 is configured to support the base station in performing S102 in the foregoing method embodiment. The receiving module 130 is configured to support the base station in performing S105, S203, and S304 in the foregoing method embodiments. The demodulation module is configured to support the base station in performing S106, S204, and S305 in the foregoing method embodiments. All related content of each step in the foregoing method embodiment may be cited in function descriptions of a corresponding function module, and details are not described herein.

Figure 8:
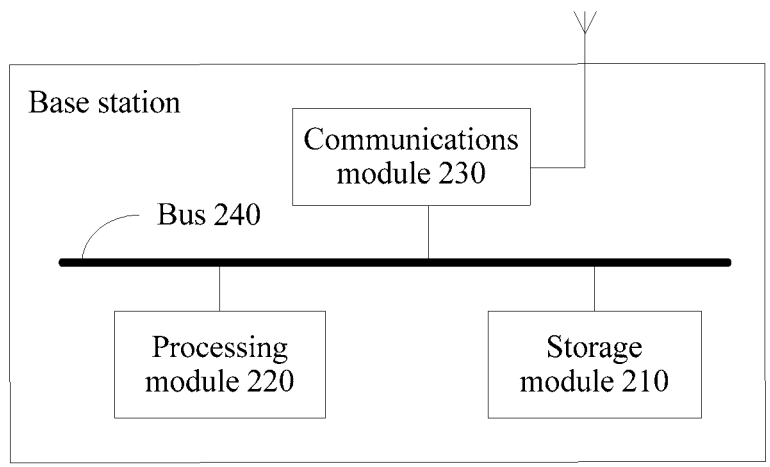
FIG. 8 is a schematic structural diagram 2 of a base station according to an embodiment of the present invention.

When an integrated unit is used, FIG. 8 is a possible schematic structural diagram of the base station in the foregoing embodiment. The base station includes a processing module 220 and a communications module 230. The processing module 220 is configured to control and manage an action of the base station. For example, the processing module 220 is configured to support the base station in performing steps performed by the obtaining module 110 and the demodulation module 140, and/or another process of the technology described in this specification. The communications module 230 is configured to support communication between the base station and another network entity. For example, the communications module 230 is configured to support the base station in performing steps performed by the configuration module 120 and the receiving module 130. As shown in FIG. 8, the base station may further include a storage module 210 and a bus 240, and the storage module 210 is configured to store program code and data of the base station.

The processing module 220 may be a processor or a controller in the base station. The baseband unit 200 in the base station shown in FIG. 2 includes at least one processor or controller, and the processor or the controller may implement or execute various example logical blocks, modules, and circuits that are described with reference to content disclosed in the present invention. The processor or the controller may be a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processor or the controller may implement or execute various example logical blocks, modules, and circuits that are described with reference to content disclosed in the present invention. The processor may be a combination of processors that implements a computing function, for example, a combination of one or more microprocessors, or a combination of a DSP and a microprocessor.

The communications module 230 may be a transceiver, a transceiver circuit, a communications interface, or the like in the base station. The transceiver, the transceiver circuit, the communications interface, or the like may be the radio remote unit 201 and the antenna 202 in the base station shown in FIG. 2.

The storage module 210 may be a memory or the like in the base station, and the memory may be integrated into the baseband unit 200 shown in FIG. 2. The memory may include a volatile memory, for example, a random access memory (RAM); or the memory may include a nonvolatile memory, for example, a read-only memory (ROM), a flash memory, a hard disk drive (HDD), or a solid state drive (SSD); or the memory may include a combination of the foregoing types of memories.

The bus 240 may be a peripheral component interconnect (PCI) bus, an extended industry standard architecture (EISA) bus, or the like. The bus 240 may be classified into an address bus, a data bus, a control bus, and the like. For ease of representation, only one bold line is used in FIG. 8 to represent the bus, but it does not indicate that there is only one bus or one type of bus.

An embodiment of the present invention further provides a computer readable storage medium. The computer readable storage medium stores one or more programs, and the one or more programs include an instruction. When the processor in the base station executes the instruction, the base station performs steps performed by the base station in the method procedure shown in the foregoing method embodiment.

Figure 9:
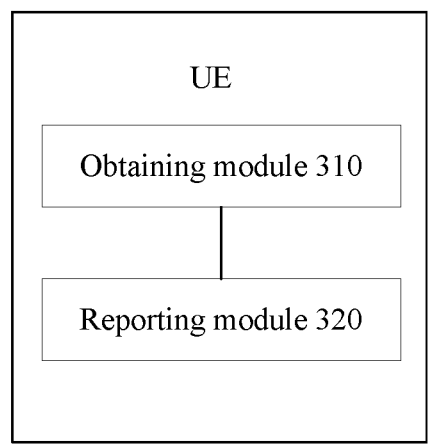
FIG. 9 is a schematic structural diagram 1 of UE according to an embodiment of the present invention.

An embodiment of the present invention provides UE. When each function module is obtained through division based on a corresponding function, FIG. 9 is a possible schematic structural diagram of the UE in the foregoing embodiment. The UE includes an obtaining module 310 and a reporting module 320. The obtaining module 310 is configured to support the UE in performing S103, S201, and S302 in the foregoing method embodiments. The reporting module 320 is configured to support the UE in performing S104, S202, and S303 in the foregoing method embodiments. All related content of each step in the foregoing method embodiment may be cited in function descriptions of a corresponding function module, and details are not described herein.

Figure 10:
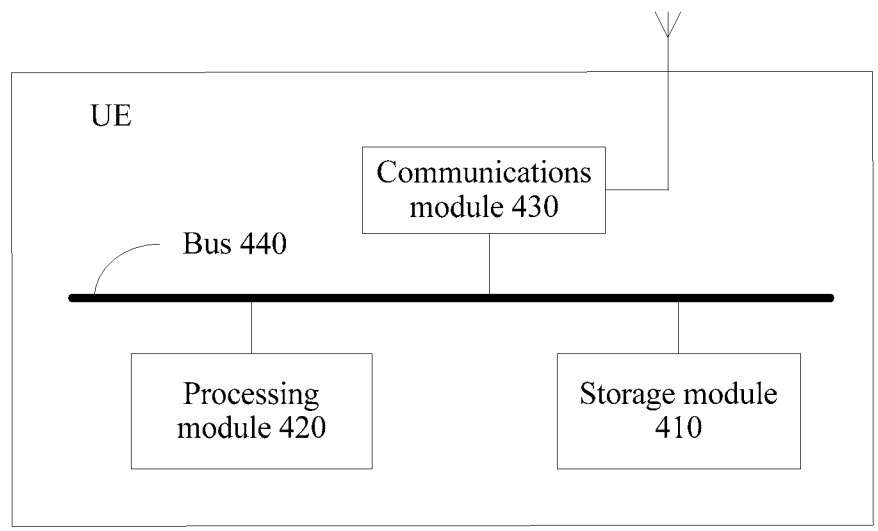
FIG. 10 is a schematic structural diagram 2 of UE according to an embodiment of the present invention.

When an integrated unit is used, FIG. 10 is a possible schematic structural diagram of the UE in the foregoing embodiment. The UE includes a processing module 420 and a communications module 430. The processing module 420 is configured to control and manage an action of the UE, for example, perform steps performed by the obtaining module 310, and/or another process of the technology described in this specification. The communications module 430 is configured to support communication between the UE and another network entity, for example, perform steps performed by the reporting module 320 and the obtaining module 310. As shown in FIG. 10, the UE may further include a storage module 410 and a bus 440, and the storage module 410 is configured to store program code and data of the UE.

The processing module 420 may be a processor or a controller in the UE. The processor or the controller may be the processor 11 in the mobile phone shown in FIG. 3. The processor or the controller may implement or execute various example logical blocks, modules, and circuits that are described with reference to content disclosed in the present invention. The processor or the controller may be a central processing unit, a general-purpose processor, a digital signal processor, an application-specific integrated circuit, a field programmable gate array or another programmable logic device, a transistor logic device, a hardware component, or any combination thereof. The processor or the controller may implement or execute various example logical blocks, modules, and circuits that are described with reference to content disclosed in the present invention. The processor may be a combination of processors that implements a computing function, for example, a combination of one or more microprocessors, or a combination of a DSP and a microprocessor.

The communications module 430 may be a transceiver, a transceiver circuit, a communications interface, or the like in the UE. The transceiver, the transceiver circuit, the communications interface, or the like may be the RF circuit 12 in the mobile phone shown in FIG. 3.

The storage module 410 may be a memory or the like in the UE, and the memory may be the memory 14 in the mobile phone shown in FIG. 3. The memory may include a volatile memory, for example, a random access memory; or the memory may include a nonvolatile memory, for example, a read-only memory, a flash memory, a hard disk drive, or a solid state drive; or the memory may include a combination of the foregoing types of memories.

The bus 440 may be an EISA bus or the like. The bus 440 may be classified into an address bus, a data bus, a control bus, and the like. For ease of representation, only one bold line is used in FIG. 10 to represent the bus, but it does not indicate that there is only one bus or one type of bus.

For other components included in the UE in this embodiment of the present invention, refer to the foregoing related descriptions of the structure of the UE shown in FIG. 3, and details are not described herein again.

An embodiment of the present invention provides a communications system, and the communications system may include a base station and UE. For details of the communications system provided in this embodiment of the present invention, refer to the schematic architectural diagram of the communications system shown in FIG. 1. The base station may be the base station shown in FIG. 1, and the UE may be the UE shown in FIG. 1. For specific descriptions of the base station and the UE, refer to the related descriptions in the foregoing method embodiments and apparatus embodiments, and details are not described herein again.

All or some of the foregoing embodiments may be implemented through software, hardware, firmware, or any combination thereof. When a software program is used to implement the embodiments, all or some of the embodiments may be implemented in a form of a computer program product. The computer program product includes one or more computer instructions. When the computer instructions are loaded and executed on a computer, the procedure or functions according to the embodiments of the present invention are all or partially generated. The computer may be a general-purpose computer, a dedicated computer, a computer network, or another programmable apparatus. The computer instructions may be stored in a computer readable storage medium or may be transmitted from a computer readable storage medium to another. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by the computer, or a data storage device, such as a server or a data center, integrating one or more usable media. The usable medium may be a magnetic medium (for example, a floppy disk, a magnetic disk, or a magnetic tape), an optical medium (for example, a digital video disc (DVD), a semiconductor medium (for example, a solid state drive (SSD)), or the like.

The foregoing descriptions about implementations allow a person skilled in the art to understand that, for the purpose of convenient and brief description, division of the foregoing function modules is used as an example for illustration. In actual application, the foregoing functions can be allocated to different modules and implemented based on a requirement, that is, an inner structure of an apparatus is divided into different function modules to implement all or some of the functions described above. For a detailed working process of the foregoing system, apparatus, and unit, refer to a corresponding process in the foregoing method embodiments, and details are not described herein again.

In the embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, and may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer readable storage medium. Based on such an understanding, the technical solutions of the present invention essentially, or the part contributing to the prior art, or all or some of the technical solutions may be implemented in the form of a software product. The computer software product is stored in a storage medium and includes several instructions for instructing a computer device (which may be a personal computer, a server, or a network device) or a processor to perform all or some of the steps of the methods described in the embodiments of the present invention. The storage medium includes any medium that can store program code, such as a flash memory, a removable hard disk, a read-only memory, a random access memory, a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A channel quality information reporting method, comprising:
   obtaining, by a user equipment (UE), a reporting method of reporting a reference signal index and a reference signal received power (RSRP) corresponding to the reference signal index by the UE, wherein the reporting method comprises a reporting granularity and a reporting mode, wherein the reporting granularity comprises a first reporting granularity and a second reporting granularity, the first reporting granularity is greater than the second reporting granularity, a quantity of bits for reporting the RSRP corresponding to the first reporting granularity is less than a quantity of bits for reporting the RSRP corresponding to the second reporting granularity, the reporting mode comprises a non-differential reporting mode and a differential reporting mode, and wherein a quantity of bits for reporting the RSRP corresponding to the reference signal index by the UE in the non-differential reporting mode is greater than or equal to a quantity of bits for reporting the RSRP corresponding to the reference signal index by the UE in the differential reporting mode; and
   reporting, by the UE and on a physical channel, the reference signal index and the RSRP corresponding to the reference signal index to a base station in the reporting method.

2. The method according to claim 1, wherein:
   the reporting method further comprises a reporting range.

3. The method according to claim 1, wherein the reporting, by the UE, the reference signal index and the RSRP corresponding to the reference signal index to the base station in the reporting method comprises:
   reporting, by the UE, a largest RSRP and a plurality of difference between average RSRP and the largest RSRP.

4. The method according to claim 1, wherein the first reporting granularity is 2, and wherein the second reporting granularity is 1.

5. The method according to claim 1, wherein the reporting method is predefined.

6. The method according to claim 1, wherein the UE determines the reporting granularity based on the reference signal index and the RSRP corresponding to the reference signal index.

7. An apparatus, comprising:
   one or more processors, and a non-transitory computer readable storage medium storing program instructions, which, when executed by the one or more processors, cause the apparatus to perform operations comprising:
   obtaining a reporting method of reporting a reference signal index and a RSRP corresponding to the reference signal index by the apparatus, wherein the reporting method comprises a reporting granularity and a reporting mode, wherein the reporting granularity comprises a first reporting granularity and a second reporting granularity, the first reporting granularity is greater than the second reporting granularity, a quantity of bits for reporting the RSRP corresponding to the first reporting granularity is less than a quantity of bits for reporting the RSRP corresponding to the second reporting granularity, the reporting mode comprises a non-differential reporting mode and a differential reporting mode, and wherein a quantity of bits for reporting the RSRP corresponding to the reference signal index by a UE in the non-differential reporting mode is greater than or equal to a quantity of bits for reporting the RSRP corresponding to the reference signal index by the UE in the differential reporting mode; and
   reporting, the reference signal index and the RSRP corresponding to the reference signal index to a base station in the reporting method.

8. The apparatus according to claim 7, wherein:
   the reporting method further comprises a first reporting range.

9. The apparatus according to claim 7, wherein the reporting the reference signal index and the RSRP corresponding to the reference signal index to the base station in the reporting method comprises:
   reporting, by the UE, an largest RSRP and a plurality of difference between average RSRP and the largest RSRP.

10. The apparatus according to claim 7, wherein:
    wherein the first reporting granularity is 2, and wherein the second reporting granularity is 1.

11. The apparatus according to claim 7, wherein the reporting method is predefined.

12. The apparatus according to claim 7, wherein the apparatus determines the reporting granularity based on the reference signal index and the RSRP corresponding to the reference signal index.

13. A non-transitory computer readable storage medium, storing computer instructions, which, when executed by at least one processor of an apparatus, cause the apparatus to perform operations comprising:
    obtaining a reporting method of reporting a reference signal index and a RSRP corresponding to the reference signal index by the apparatus, wherein the reporting method comprises a reporting granularity, and a reporting mode, the reporting granularity comprises a first reporting granularity and a second reporting granularity, the first reporting granularity is greater than the second reporting granularity, a quantity of bits for reporting the RSRP corresponding to the first reporting granularity is less than a quantity of bits for reporting the RSRP corresponding to the second reporting granularity, the reporting mode comprises a non-differential reporting mode and a differential reporting mode, and wherein a quantity of bits for reporting the RSRP corresponding to the reference signal index by the UE in the non-differential reporting mode is greater than or equal to a quantity of bits for reporting the RSRP corresponding to the reference signal index by the UE in the differential reporting mode; and reporting the reference signal index and the RSRP corresponding to the reference signal index to a base station in the reporting method.

14. The non-transitory computer readable storage medium according to claim 13, wherein:

the reporting method further comprises a reporting range.

15. The non-transitory computer readable storage medium according to claim 13, wherein the reporting the reference signal index and the RSRP corresponding to the reference signal index to the base station in the reporting method comprises:

reporting, by the UE, a largest RSRP and a plurality of difference between average RSRP and the largest RSRP.

16. The non-transitory computer readable storage medium according to claim 13, wherein the first reporting granularity is 2, and wherein the second reporting granularity is 1.

17. The non-transitory computer readable storage medium according to claim 13, wherein the reporting method is predefined.

18. The non-transitory computer readable storage medium according to claim 13, wherein the apparatus determines the reporting granularity based on the reference signal index and the RSRP corresponding to the reference signal index.

19. The method according to claim 1, wherein the physical channel is one of a physical uplink control channel or a physical uplink shared channel.

* * * * *